United States Patent
Liu

(10) Patent No.: US 9,495,032 B2
(45) Date of Patent: Nov. 15, 2016

(54) OPTICAL TOUCH SCREEN

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Rongcheng Liu, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 14/349,707

(22) PCT Filed: Nov. 29, 2013

(86) PCT No.: PCT/CN2013/088098
§ 371 (c)(1),
(2) Date: Apr. 4, 2014

(87) PCT Pub. No.: WO2014/201807
PCT Pub. Date: Dec. 24, 2014

(65) Prior Publication Data
US 2014/0368758 A1 Dec. 18, 2014

(30) Foreign Application Priority Data

Jun. 17, 2013 (CN) .......................... 2013 1 0239302

(51) Int. Cl.
*G06F 3/041* (2006.01)
*G06F 3/042* (2006.01)
*G06F 3/0354* (2013.01)

(52) U.S. Cl.
CPC ......... *G06F 3/0412* (2013.01); *G06F 3/03542* (2013.01); *G06F 3/042* (2013.01)

(58) Field of Classification Search
USPC ................ 345/173–175; 216/11–13; 349/12
See application file for complete search history.

(56) References Cited

U.S. PATENT DOCUMENTS

| 7,250,940 | B2 * | 7/2007 | Jayanetti | ................ G06F 3/045 345/173 |
| 2010/0066704 | A1 * | 3/2010 | Kasai | ..................... A63F 13/04 345/175 |

(Continued)

FOREIGN PATENT DOCUMENTS

| CN | 1906641 A | 1/2007 |
| CN | 101989151 A * | 3/2011 |

(Continued)

OTHER PUBLICATIONS

Dec. 22, 2015—International Preliminary Report on Patentability Appn PCT/CN2013/088098.

(Continued)

*Primary Examiner* — Jason Olson
*Assistant Examiner* — Deeprose Subedi
(74) *Attorney, Agent, or Firm* — Banner & Witcoff, Ltd.

(57) ABSTRACT

The embodiments of the present invention relate to an optical touch screen, comprising: a substrate; and a transparent first electrode layer, a photosensitive material layer, and a second electrode layer formed on the substrate. The photosensitive material layer is formed in a grid-like structure to isolate the first electrode layer and the second electrode layer and sense light irradiated on the optical touch screen. The embodiments of the present invention also provide a method for manufacturing an optical touch screen. According to the embodiments of the present invention, the position of the light emitted from the light source on the display screen can be determined by sensing the light emitted from the outside light source, so that human-computer interaction for a large-size screen display device can be achieved.

9 Claims, 4 Drawing Sheets

(56) References Cited

U.S. PATENT DOCUMENTS

| | | | | |
|---|---|---|---|---|
| 2010/0265439 A1* | 10/2010 | Ishitobi | ............... | G02B 5/201 349/106 |
| 2012/0274608 A1* | 11/2012 | Kim | ............... | G01J 1/44 345/175 |
| 2012/0327032 A1* | 12/2012 | Jeon | ............... | H01L 27/14609 345/175 |
| 2014/0218161 A1* | 8/2014 | Liu | ............... | H01L 31/09 338/15 |
| 2015/0116270 A1* | 4/2015 | Kanna | ............... | G06F 3/0412 345/174 |
| 2015/0309651 A1* | 10/2015 | Papakostas | ............... | G06F 3/0414 345/174 |
| 2016/0048245 A1* | 2/2016 | Papakostas | ............... | G06F 3/045 345/174 |

FOREIGN PATENT DOCUMENTS

| | | |
|---|---|---|
| CN | 101989151 A | 3/2011 |
| CN | 202306503 | 7/2012 |
| CN | 102799311 | 11/2012 |
| CN | 102929031 | 2/2013 |
| CN | 103345338 A | 10/2013 |

OTHER PUBLICATIONS

Oct. 20, 2015—(CN)—First Office Action Appn 201310239302.X with English Tran.

Apr. 22, 2016—(CN)—Second Office Action Appn 201310239302.X with English Tran.

* cited by examiner (a)　　　　　　　　　　　(b)

(a)　　　　　　　　　　　(b)

OPTICAL TOUCH SCREEN

CROSS REFERENCE TO RELATED APPLICATIONS

This application is based on International Application No. PCT/CN2013/088098 filed on Nov. 29, 2013, which claims priority to Chinese National Application No. 201310239302.X filed on Jun. 17, 2013. The entire contents of each and every foregoing application are incorporated herein by reference.

TECHNICAL FIELD

Embodiments of the present invention relate to display technique, and more particularly, to an optical touch panel and a method for manufacturing the same.

BACKGROUND

As one kind of the latest developed input and display devices, touch screens are the most simple, convenient, and natural manner of human-computer interaction, and have been widely used as display screens for mobile phones, tablet PCs or computers. However, for some large-size screens, for example, TV sets of 110 inch, if touch interaction is employed, some portions of the screens may be impossible or hard to be touched by finger due to the large size. For example, when the large screens are hanged at high positions, they are inconvenient to be touched.

SUMMARY

An embodiment of the present invention provides an optical touch screen, comprising: a substrate; and a first electrode layer, a photosensitive material layer, and a second electrode layer that are formed on the substrate. The first electrode layer is a transparent electrode, and the photosensitive material layer is formed in a grid-like structure, isolating the first electrode layer and the second electrode layer, and sensing light irradiated on the optical touch screen.

Both of the first electrode layer and the second electrode layer are formed in a grid-like structure.

The first electrode layer is formed in a plate-like structure, and the second electrode layer is formed in a grid-like structure.

The first electrode layer is formed in a grid-like structure, the second electrode layer is formed in a plate-like structure, and the second electrode layer is a transparent electrode.

The optical touch screen further comprises a first constant voltage source and a second constant voltage source, the first constant voltage source is connected to one end of the transparent first electrode layer or the second electrode layer through a plurality of current output paths, the second constant voltage source is connected to the other end opposite to the end of the electrode layer connected to the first constant voltage layer through a plurality of current output paths, a voltage of the first constant voltage source is equal to a voltage of the second constant voltage source; the other electrode layer is connected to a third constant voltage source, a voltage of the third constant voltage source is different from the voltages of the first constant voltage source and the second constant voltage source.

Both of the first constant voltage source and the second constant voltage source are connected to the same grid-like electrode layer. A number of the current output paths of the grid-like electrode layers respectively connected with the first constant voltage source and the second constant voltage source are equal to a number of grid lines in a horizontal direction of the grid or a number of the grid lines in a vertical direction of the grid. Each of the current output paths connected with the first constant voltage source is connected to one end of corresponding one grid line in the same direction, respectively, and each of the current output paths connected with the second constant voltage source is connected to the other end of the corresponding one grid line in the same direction, respectively.

The third constant voltage source is grounded.

A material of the photosensitive material layer is cadmium sulfide, selenium, aluminum sulfide, lead sulfide, or bismuth sulfide.

The optical touch screen further comprises a color filter resin layer formed in a hollow region of the grid.

The optical touch screen further comprises a black matrix disposed on one of the first electrode layer and the second electrode layer which is further away from the substrate. The black matrix is formed in a grid-like structure, and a projection of the black matrix on the substrate covers a projection of the photosensitive material layer on the substrate.

An embodiment of the present invention further provides a method for manufacturing an optical touch screen, comprising: forming a pattern comprising a first electrode layer on a substrate; forming a pattern comprising a grid-like photosensitive material layer; forming a pattern comprising a second electrode layer, the photosensitive material layer being configured to isolate the first electrode layer and the second electrode layer.

The first electrode layer is formed in a grid-like structure by one patterning process.

The second electrode layer is formed in a grid-like structure by one patterning process.

The grid-like photosensitive material layer is formed by one patterning process.

The patterns of the first electrode layer, the grid-like photosensitive material layer, and the second electrode layer are formed together by one patterning process.

After forming the pattern comprising the second electrode layer, the method further comprises forming a pattern of a grid-like black matrix so that a projection of the grid of the black matrix onto the substrate covers a projection of the grid of the photosensitive material layer onto the substrate.

After forming the pattern comprising the second electrode layer, the method further comprises forming a pattern of a color filter resin in the hollow region of the grid of the photosensitive material layer.

BRIEF DESCRIPTION OF THE DRAWINGS

FIG. 3(a) is a schematic plan view, and FIG. 3(b) is a cross-section view taken along line A-A;

DETAILED DESCRIPTION

In order to make objects, technical solutions and advantages of the embodiments of the invention apparent, the technical solutions of the embodiment will be described clearly and fully in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention. Hereinafter, various exemplary embodiments are described in detail with reference to the accompanying drawings. Obviously, the following embodiments are used to explain the present invention, and are not intend to limit the present invention.

Embodiment 1

Figure 1:
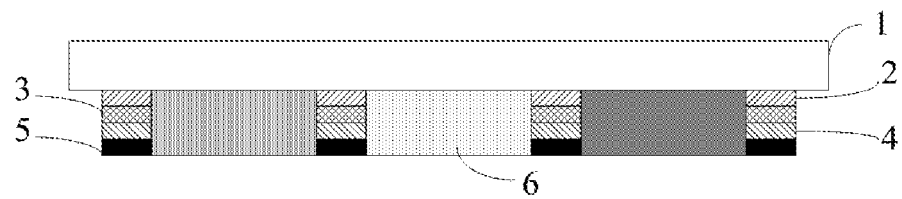
FIG. 1 is a schematic view of the structure of an optical touch screen according to embodiment 1 of the present invention.

As shown in FIG. 1, an optical touch screen according to the present embodiment comprises a first electrode layer 2, a photosensitive material layer 3 and a second electrode layer 4 that are sequentially formed on a substrate 1. Since the photosensitive material layer 3 is required to sense the light emitted from a light source, the first electrode layer 2 is a transparent electrode layer. In order to facilitate to determine the position irradiated by the light emitted from the light source, the photosensitive material layer 3 is formed in a grid-like structure and isolates the first electrode layer 2 and the second electrode layer 4. Both of the first electrode layer 2 and the second electrode layer 4 of the optical touch screen may be transparent plate-shaped electrodes. However, the two transparent electrode layers reduce the transmittance of the optical touch screen.

In the present embodiment, both of the first electrode layer 2 and the second electrode layer 4 are formed in a grid-like structure, and the projection of the photosensitive material layer 3 onto the substrate 1 covers the projections of the first electrode layer 2 and the second electrode layer 4 onto the substrate 1 so as to isolates the two electrode layers. Where the substrate is used as a color filter substrate or as an opposite substrate for an array substrate of color filter on array (COA) mode, the first electrode layer, the second electrode layer, and the photosensitive material layer may be disposed in the region of the substrate where a black matrix is disposed. That is, the projection of the black matrix onto the substrate coincides with the projections of the above mentioned three layers onto the substrate, and thus the transmittance of the completed display screen will not be affected.

Where the substrate is used as a color filter substrate, the second electrode layer 4 may be a transparent electrode. Meanwhile, the grid of a black matrix 5 is further formed on the grid of the second electrode 4, and a color filter resin 6 is formed in the regions enclosed within this grid. The second electrode layer 4 may also be an opaque electrode, such as a metal electrode. In this case, the second electrode layer 4 may act as the black matrix. Therefore, it is unnecessary to fabricate the black matrix 5 any more, and thus materials and processes are saved. Where the substrate is used as a color filter substrate, the optical touch screen further comprises an array substrate disposed opposite to the color filter substrate and a corresponding pixel driving circuit.

In the present embodiment, the material of the photosensitive material layer 3 may be cadmium sulfide, selenium, aluminum sulfide, lead sulfide, or bismuth sulfide, and so on.

The optical touch screen according to the present embodiment determines the optical touch positions with the optical detection circuit disposed in the peripheries of the display panel. The optical detection circuit comprises a first constant voltage source and a second constant voltage source. The first constant voltage source is connected to one end of one of the first transparent electrode layer and the second electrode layer through several current output paths, and the second constant voltage source is connected to the opposite end of the electrode layer connected to the first constant voltage source through several current output paths. The voltage of the first constant voltage source is equal to the voltage of the second constant voltage source. Another electrode layer is connected with a third constant voltage source. The third constant voltage source has a voltage different from those of the first and second constant voltage sources.

For example, the number of the current output paths of the grid-like electrode layers respectively connected with the first constant voltage source and the second constant voltage source are equal to the number of the grid lines in the horizontal direction of the grid or number of the grid lines in the vertical direction of the grid. Each of the current output paths connected with the first constant voltage source is connected to one end of one grid line in the same direction, respectively, and each of the current output paths connected with the second constant voltage source is connected to the other end of the grid line in the same direction, respectively.

Figure 2:
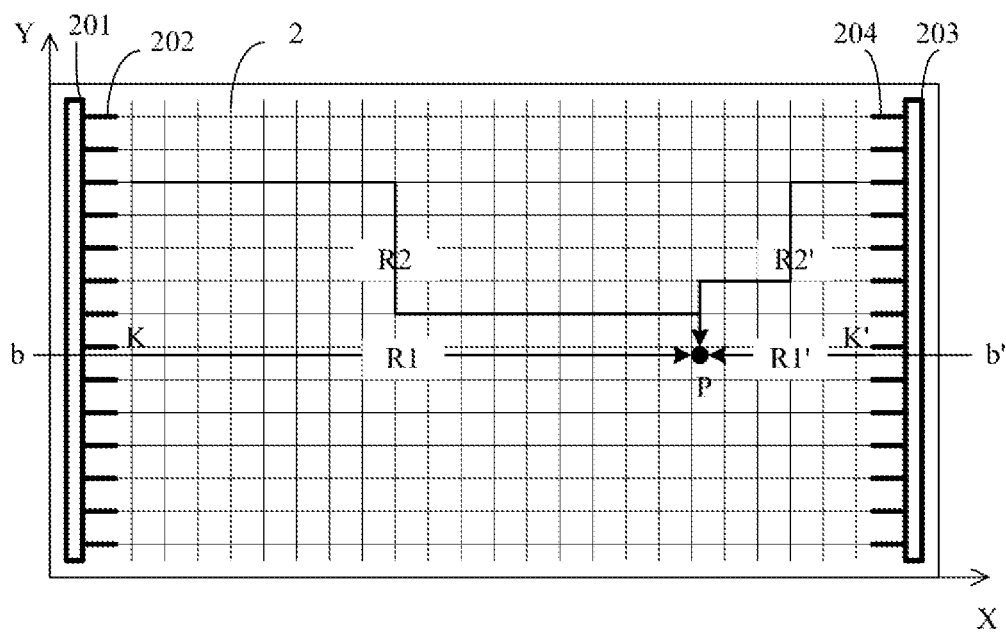
FIG. 2 is a schematic view illustrating the positioning principle of the optical touch screen of embodiment 1.

As particularly shown in FIG. 2, a first constant voltage source 201 and a second constant voltage source 203 are disposed at left and right ends of the first electrode layer 2, respectively. The first constant voltage source 201 and the second constant voltage source 203 may also be disposed at upper and lower ends of the first electrode layer 2. The present embodiment takes the case of respectively providing one constant voltage source at left or right end as an example. The first constant voltage source 201 is connected to one end of a horizontal grid line of the first electrode layer 2 through a plurality of current output paths 202, respectively. The second constant voltage source 203 is connected to the other end of the horizontal grid line of the first electrode layer 2 through a plurality of current output paths 204, respectively. The two constant voltage sources have a same voltage. Each of the paths is provided with a current monitor, i.e., chip controller. In order to accurately determine the position of the emitted light on the display screen, the number of the current output paths corresponding to each of the constant voltage sources is equal to the number of the horizontal grid lines.

The second electrode layer 4 (not shown in FIG. 2) is connected to a third constant voltage source. The third constant voltage source applies a constant voltage, of which the voltage value different from that of the constant voltage source of the first electrode layer 2, to the second electrode layer 4. For example, the second electrode layer 4 may be grounded or be applied a voltage with the voltage value higher than those of the first and second constant voltage sources.

Take the case of optical touch occurring at point P as an example to explain the operating manner of the above construction. When a relative strong light is irradiated at point P, the conductive property of the photosensitive material layer 3 at point P will be improved, so that the first electrode layer 2 conducts with the second electrode layer 4, and thus potential of the first electrode layer 2 at point P changes. When the potential of the second electrode layer 4 is higher than that of the first electrode layer 2, the potential of point P is pulled high. When the potential of the second electrode layer 4 is lower than that of the first electrode layer 2, the potential of point P is pulled low. Take the case of the potential of point P being pulled low as an example. Since the potential of point P is lower than the potentials of the first electrode layer at other points, the constant voltage sources at both sides of the first electrode layer will complement the potential at point P, thus current will generate in all directions at point P. Because different current output paths have different distance from the touch point P, that is, the equivalent resistance between the current output paths and point P is different (R1<R2), the magnitudes of the discharging currents detected by all the path are different. Assuming that a maximal magnitude $I_{max}$ of the discharging currents is detected by path K at the left side, it denotes that path K has the minimal distance from point P. Since the magnitude of the resistance is proportional to the distance, it denotes that path K is closest to point P, and the Y coordinate corresponding to path K is the Y coordinate b of point P. Assuming that current discharged from path K' at the right side corresponding to path K is $I'_{max}$, the X coordinate of point P is determined by the equivalent resistances R1 and R1' between point P and the left and right sides. That is to say, the X coordinate is determined by the current magnitude of paths K and K': $x=k \times a \times (I'_{max})/(I_{max}+I'_{max})$, here k is a correction factor, and thus the coordinates of point P is ($k \times a \times (I'_{max})/(I_{max}+I'_{max})$, b). When a constant voltage higher than the constant voltage of the first electrode layer 2 is applied to the second electrode layer 4, the principle of determining illumination touch positions is identical to the case of applying lower voltage, but the flowing direction of the current is reversed, i.e., from the touch point P to the constant voltage sources at both sides.

In the present embodiment, the irradiated position of the light emitted from the light source is positioned in a manner of conducting the first electrode layer 2 and the second electrode layer 4 by the photosensitive material layer 3 irradiated by the light, so that human computer interaction for a large-size screen display device can be achieved.

The optical touch screen according to the present embodiment can determine the touch position with only two constant voltage sources without additional driving circuit in periphery, and has simply circuit structure and low costs.

Figure 3:
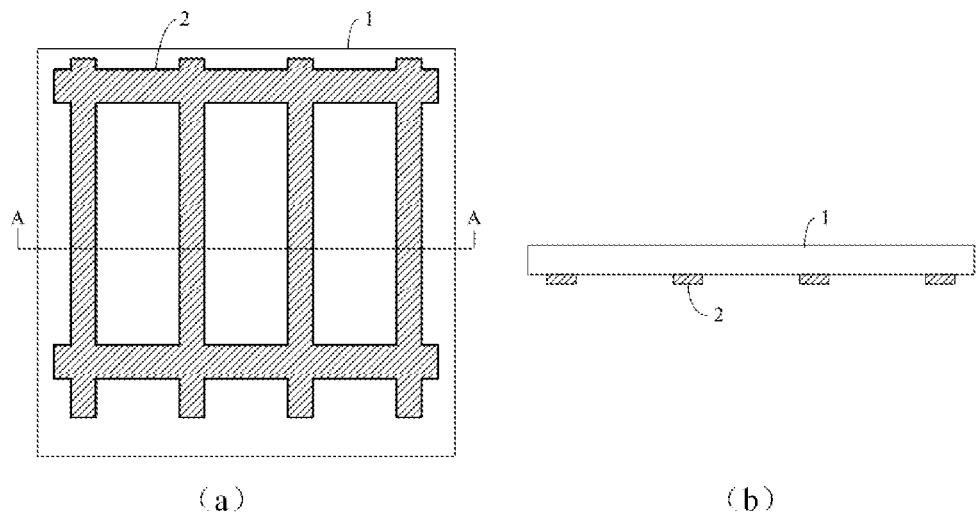
FIG. 3 is a schematic view of forming a first transparent electrode layer on a substrate in a method for manufacturing the optical touch screen of embodiment 1.

The present embodiment also provides a method for manufacturing the optical touch screen, comprising:

Step 1: as shown in FIG. 3, forming a pattern comprising a transparent first electrode layer 2 on a substrate 1. For example, the pattern comprising the transparent first electrode layer 2 is formed by a patterning process, such as coating photoresist, exposure, development, etching, stripping photoresist, and so on.

Figure 4:
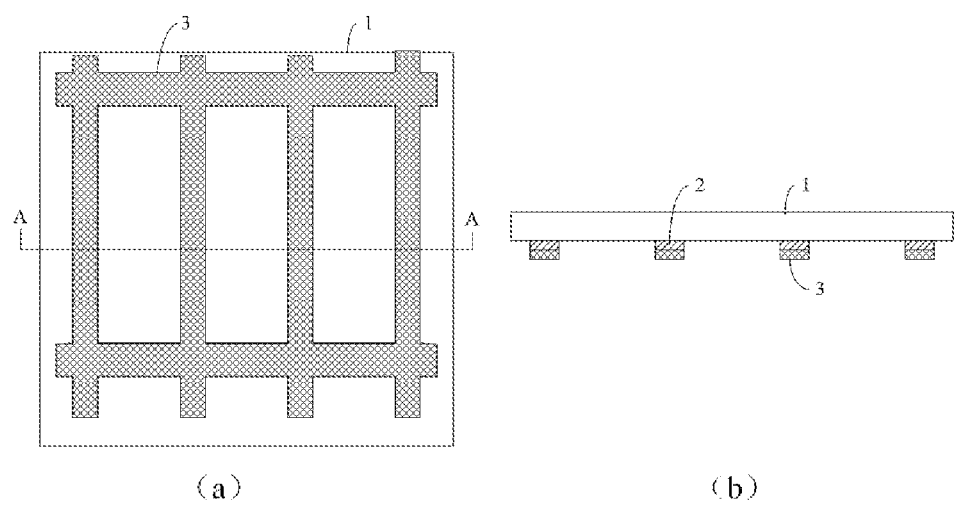
FIG. 4 is a schematic view of forming a photosensitive material layer on the first transparent electrode layer in the method for manufacturing the optical touch screen of embodiment 1, FIG. 4(*a*) is a schematic plan view, and FIG. 4(*b*) is a cross-section view taken along line A-A.

Step 2: as shown in FIG. 4, forming a pattern comprising a grid-like photosensitive material layer 3. For example, the photosensitive material layer 3 may be formed by one patterning process.

Figure 5:
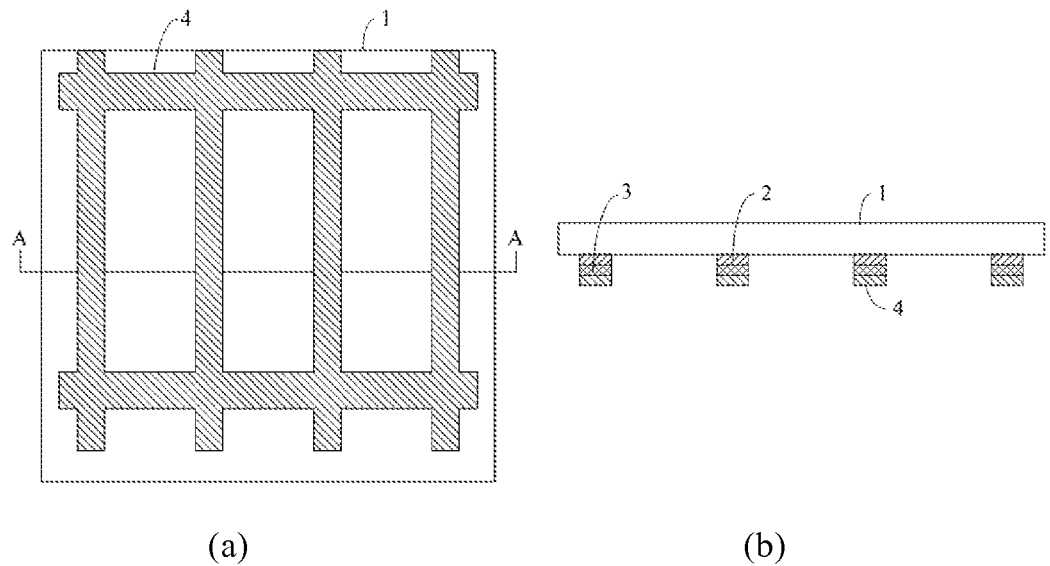
FIG. 5 is a schematic view of forming a second electrode layer on the photosensitive material layer in a method for manufacturing the optical touch screen of embodiment 1, FIG. 5(*a*) is a schematic plan view, and FIG. 5(*b*) is a cross-section view taken along line A-A.

Step 3: as shown in FIG. 5, forming a pattern comprising a second electrode layer 4. For example, the second electrode layer 4 may be formed by one patterning process.

It is apparent that the first electrode layer 2, the photosensitive material layer 3 and the second electrode layer 4 may be formed by the same one patterning process if all of the three layers have the same grid-like structure. For example, they may be formed by the following steps:

Step 1: sequentially forming a first transparent conductive thin film, a photosensitive material thin film and a second transparent conductive thin film on a substrate 1 by film forming methods such as sputtering method, chemical vapor deposition method, and so on.

Step 2: coating photoresist on the substrate formed with above mentioned thin films, performing exposure and development on the substrate, and forming a photoresist retention region corresponding to the region to form the first electrode layer 2 and a photoresist non-retention region corresponding to the hollow region within the grid-like first electrode layer 2.

Step 3: removing the first transparent conductive thin film, the photosensitive material thin film and the second transparent conductive thin film in the photoresist non-retention region so as to form a pattern comprising the first electrode layer 2, the photosensitive material layer 3 and the second electrode layer 4. For example, the first and second transparent conductive layers may be removed by wet etching method, and the photosensitive material layer may be removed by dry etching method.

In the present embodiment, both of the first electrode layer 2 and the second electrode layer 4 are in a grid-like structure. The projection of the photosensitive material layer 3 on the substrate 1 covers the projection of the grids of the grid-like electrode layers on the substrate 1.

The optical touch screen provided by the present embodiment can not only attached at the outside of the display device as an add-on type touch screen, but also directly integrated in the color filter substrate to form an in-cell type touch screen.

Figure 6:
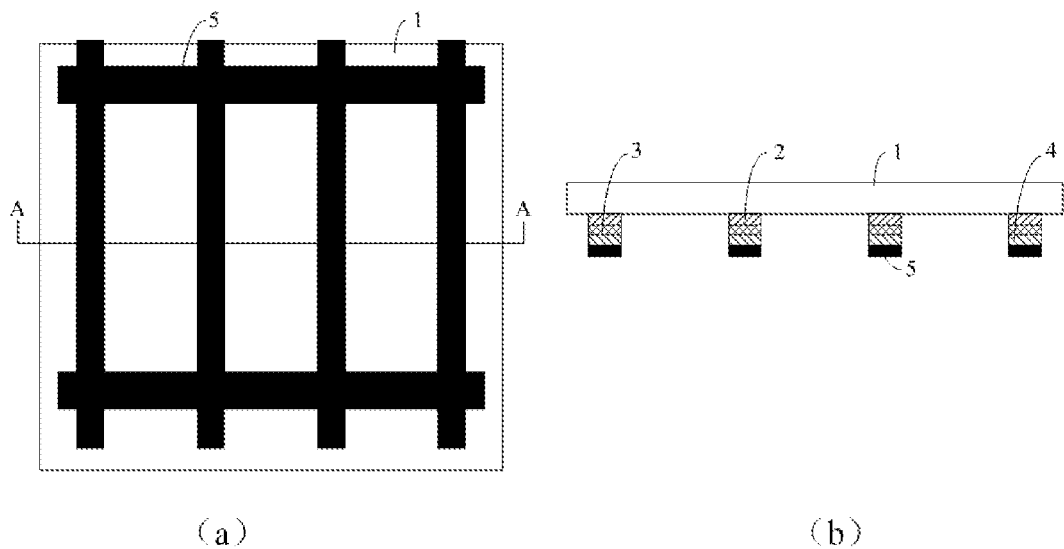
FIG. 6 is a schematic view of forming a black matrix on the second electrode layer in a method for manufacturing the optical touch screen of embodiment 1, FIG. 6(*a*) is a schematic plan view, and FIG. 6(*b*) is a cross-section view taken along line A-A.

As shown in FIG. 6, if the substrate is a color filter substrate, after forming the pattern comprising the second electrode layer 4, the method further comprises forming a pattern of a grid-like black matrix 5 so that the projection of the grid of the black matrix 5 onto the substrate covers the grid of the photosensitive material layer 3. This step can be omitted if the second electrode layer 4 is an opaque electrode.

Figure 7:
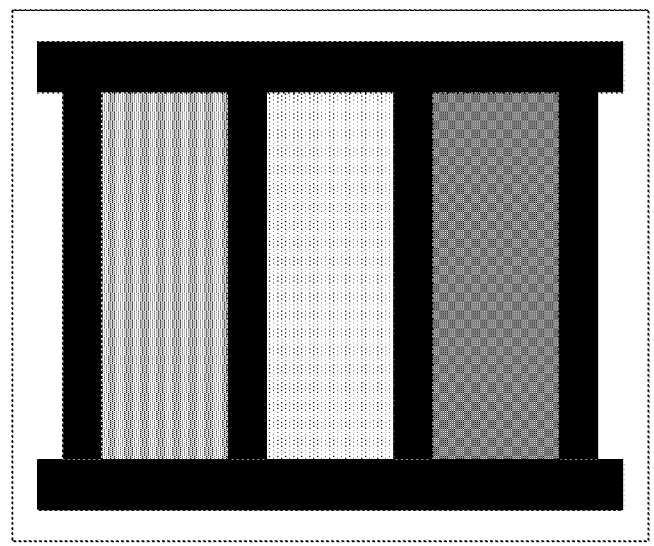
FIG. 7 is a schematic view after forming a color filter resin on the resultant structure of FIG. 6.

As shown in FIG. 7, after forming the pattern comprising the second electrode layer, the method further comprises forming a pattern of a color filter resin 6 in the hollow region of the photosensitive material layers 3 so as to form a color filter substrate. Where it needs to form the black matrix 5, the black matrix 5 and the color filter resin 6 may be formed in a reverse order.

The present embodiment only particularly describes the portions of the structure of the optical touch screen related to sensing light emitted from an external light source and positioning. It is apparent that the optical touch screen also comprises the components such as an array substrate, a pixel driving circuit, and so on, which may be fabricated by methods like those in the prior art. For example, a first electrode layer 2, a photosensitive material layer 3 and a second electrode layer 4 are formed in a color filter substrate, a light detection circuit may be integrated in the pixel driving circuit, and then the cell-assembling of the array substrate and the color filter substrate is completed to form the optical touch screen of the present embodiment.

Embodiment 2

Figure 8:
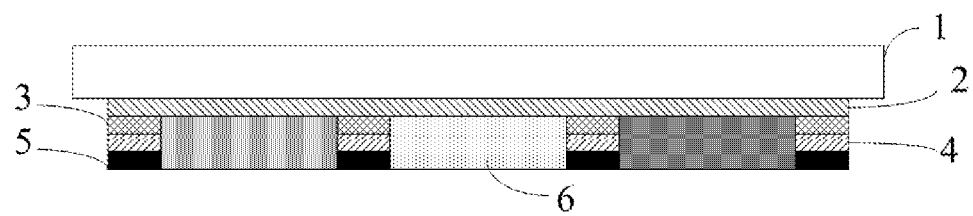
FIG. 8 is a schematic view of structure of an optical touch screen according to embodiment 2 of the present invention.

As shown in FIG. 8, the optical touch screen of the present embodiment is substantially the same as that of embodiment 1, except that the transparent first electrode layer 2 is a plate-like electrode. The transmittance is reduced to a certain extent compared with embodiment 1. However, the plate-like first electrode layer 2 can function as a static electric shielding layer when no touch occurs, so that the influence of external electric signals on the electric signals in the display panel is prevented. The method for manufacturing the optical touch screen according to the present embodiment is substantially the same as that of embodiment 1, except that the transparent first electrode layer 2 is made as an electrode covering the whole surface without being etched. The principle for determining positions of the light emitted from the light source is identical to that of embodiment 1, and will be omitted here.

Embodiment 3

Figure 9:
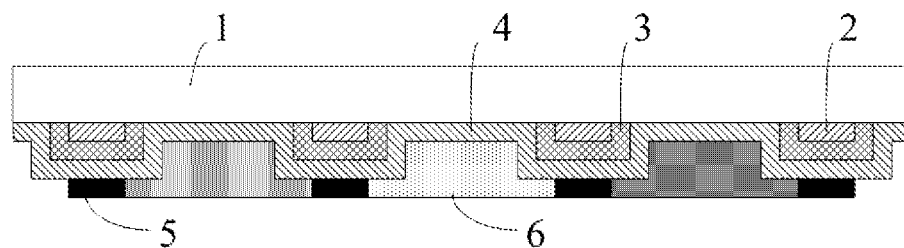
FIG. 9 is a schematic view of structure of an optical touch screen according to embodiment 3 of the present invention.

As shown in FIG. 9, the optical touch screen of the present embodiment is substantially the same as that of embodiment 1, except that the transparent second electrode layer 4 is a plate-like electrode. The transmittance is reduced to a certain extent compared with embodiment 1. However, the plate-like second electrode layer 4 can function as a static electric shielding layer when no touch occurs, so that the influence of external electric signals on the electric signals in the display panel is prevented. The method for manufacturing the optical touch screen according to the present embodiment is substantially the same as that of embodiment 1, except that the transparent second electrode layer is made as plate-like electrode 4. The principle for determining positions of the light emitted from the light source is identical to that of embodiment 1, and will be omitted here.

In the present embodiment, light is emitted by a handheld light emitting device, such as laser pointer. The handheld light emitting device comprises the following components:

A first light emitting device and a first control button are provided. The first control button controls the first light emitting device to emit a ray of first light. The first light must be visible to human eyes so as to display positions and to determine the position of the light emitted by the light source on the screen. Such light does not have the function of selection; it only tells the user what position the light source is aimed at;

A second light emitting device and a second control button are provided. The second control button controls the second light emitting device to emit a ray of second light which is coaxial with the first light. The second light has the function of "selection." The second light may be invisible light. The first light is used to display the position of the light emitted from the light source on the display screen. The invisible light changes the conductivity of the irradiated portion of the photosensitive material layer.

The detection circuit of the present embodiment determines whether the photosensitive material layer senses the first light or the second light based on the current change due to the resistivity change of the photosensitive material layer after sensing the light emitted from the light source. If the second light is sensed, the same selection operations as the optical touch screen such as click, drag, and so on, are performed. The second button is controlled, such as clicking the second button, pressing the second button and moving the handheld light emitting device, in order to control whether to emit the second light.

During human-computer interaction, the user only needs to select the application icons available for selection on the screen, such as my computer, IE browser, buttons in IE browser, and so on. Like clicking these icons or buttons with a mouse when using a computer, the user uses the handheld light emitting device to emit first light, aims at the available icons or buttons with the first light, and then presses the second control button to emit second light to select the icon.

According to embodiments of the present invention, the first electrode layer, the photosensitive material layer, and the second electrode layer are sequentially formed on the substrate. The photosensitive material layer has different conductivity under the action of outside light illumination of different intensities. The electrical conduction characteristics of the electrode layers on both sides of the photosensitive material layer are varied accordingly. The position where electrical conduction varies depends on the position of the outside light illumination. Therefore, the position of the light emitted from the light source on the display screen can be determined by way of sensing the light emitted from outside light source, so that human-computer interaction for a large-size screen display device can be achieved.

The foregoing is merely the exemplary embodiments of the present invention, and is not intended to limit the present invention. It will note for those skilled in the art that some modifications and substitutions without departing technical principle of the present invention are within the protection scope of the present invention.

The invention claimed is:

1. An optical touch screen, comprising:
a substrate;
a first electrode layer, a photosensitive material layer, and a second electrode layer that are formed on the substrate, the first electrode layer being a transparent electrode, and the photosensitive material layer being formed in a grid-like structure, isolating the first electrode layer and the second electrode layer, and sensing light irradiated on the optical touch screen; and
a first constant voltage source and a second constant voltage source, wherein the first constant voltage source is connected to one end of the transparent first electrode layer or the second electrode layer through a plurality of current output paths, the second constant voltage source is connected to the other end opposite to the end of the electrode layer connected to the first constant voltage layer through a plurality of current output paths, a voltage of the first constant voltage source is equal to and has a same polarity with a voltage of the second constant voltage source, so as to make entirety of the electrode layer have a same voltage; the other electrode layer is connected to a third constant voltage source, and a voltage of the third constant voltage source is different from the voltages of the first constant voltage source and the second constant voltage source;

wherein, where light irradiates on the optical touch screen, the first electrode layer conducts with the second electrode layer, and a position where the light irradiates is determined according to magnitudes of currents output from each of the current output paths.

2. The optical touch screen according to claim 1, wherein both of the first electrode layer and the second electrode layer are formed in a grid-like structure.

3. The optical touch screen according to claim 1, wherein the first electrode layer is formed in a plate-like structure, and the second electrode layer is formed in a grid-like structure.

4. The optical touch screen according to claim 1, wherein the first electrode layer is formed in a grid-like structure, the second electrode layer is formed in a plate-like structure, and the second electrode layer is a transparent electrode.

5. The optical touch screen according to claim 1, wherein both of the first constant voltage source and the second constant voltage source are connected to a same grid-like electrode layer, a number of the current output paths of the grid-like electrode layers respectively connected with the first constant voltage source and the second constant voltage source are equal to a number of grid lines in a horizontal direction of a grid or a number of the grid lines in a vertical direction of the grid, each of the current output paths connected with the first constant voltage source is connected to one end of corresponding one grid line in the same direction, respectively, and each of the current output paths connected with the second constant voltage source is connected to the other end of the corresponding one grid line in the same direction, respectively.

6. The optical touch screen according to claim 1, wherein the third constant voltage source is grounded.

7. The optical touch screen according to claim 1, wherein a material of the photosensitive material layer is cadmium sulfide, selenium, aluminum sulfide, lead sulfide, or bismuth sulfide.

8. The optical touch screen according to claim 1, further comprising a color filter resin layer formed in a hollow region of the grid.

9. The optical touch screen according to claim 8, further comprising a black matrix disposed on one of the first electrode layer and the second electrode layer which is further away from the substrate, the black matrix is formed in a grid-like structure, a projection of the black matrix onto the substrate covers a projection of the photosensitive material layer onto the substrate.

* * * * *